(12) United States Patent
Ranger et al.

(10) Patent No.: US 6,393,568 B1
(45) Date of Patent: *May 21, 2002

(54) ENCRYPTION AND DECRYPTION SYSTEM AND METHOD WITH CONTENT ANALYSIS PROVISION

(75) Inventors: Michel M. Ranger, Nepean; Paul C. Van Oorschot, Ottawa, both of (CA)

(73) Assignee: Entrust Technologies Limited, Ottawa (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,563

(22) Filed: Oct. 23, 1997

(51) Int. Cl.$^7$ ................................................. G06F 11/30
(52) U.S. Cl. ...................................... 713/188; 713/189
(58) Field of Search ............................... 380/4, 49, 25, 380/21, 30; 707/533; 713/200, 201, 188, 189; 709/206; 714/33, 38

(56) References Cited

U.S. PATENT DOCUMENTS

| | | | |
|---|---|---|---|
| 5,606,609 A | * 2/1997 | Houser et al. | 713/179 |
| 5,832,208 A | * 11/1998 | Chen et al. | 395/187.01 |
| 5,889,943 A | * 3/1999 | Ji et al. | 395/187.01 |
| 5,909,493 A | * 6/1999 | Motoyama | 713/154 |
| 5,987,610 A | * 11/1999 | Franczek et al. | 713/200 |
| 5,999,967 A | * 12/1999 | Sundsted | 709/26 |
| 6,141,681 A | * 10/2000 | Kyle | 709/206 |

OTHER PUBLICATIONS

Victor Woodard, Stomping out mail viruses, PC Week, P.No8, Jun. 15, 1996.*
Shawn McCarthy, ThunderByte takes the stinger out of encrypted viruses, Gov't Computer News, pp. 1–3, Aug. 15, 1994.*
Nachenberg, Carey, Computer virus–antivirus coevolution, ACM, Jan. 1997; pp. 1–9.*
Veldman, Frans, "Generic Decryptors Emulators of the future", 1998.

* cited by examiner

Primary Examiner—Gilberto Barron, Jr.
Assistant Examiner—Ho S. Song
(74) Attorney, Agent, or Firm—Vedder, Price, Kaufman & Kammholz

(57) ABSTRACT

A computer based encryption and decryption system and method provides content analysis through a content inspection mechanism, such as detection of a computer virus using a virus detection algorithm based on determining whether digital input information is encrypted. The content inspection mechanism analyzes decrypted content for such things as virus patterns, keywords, unknown program format, or any other content based criteria. The system generates a decryption request to decrypt encrypted digital input information prior to applying content analysis, such as virus detection. In response to the decryption request, the system decrypts the encrypted information prior to content analysis such as virus detection and applies a content analysis application, such as a virus detection algorithm, to the decrypted data If desired, when the decryption requires access to cryptographic keys which the decryptor does not have immediate access to, keys may be acquired from a controlled key repository through use of key release agent methods.

39 Claims, 3 Drawing Sheets

ENCRYPTION AND DECRYPTION SYSTEM AND METHOD WITH CONTENT ANALYSIS PROVISION

BACKGROUND OF THE INVENTION

The invention relates generally to computer based encryption and decryption systems and more particularly to computer based encryption and decryption systems having content analysis mechanisms such as computer virus detection.

Computer networks containing cryptographic systems offer secure transmission and receipt of electronic data including images or other information. Such systems are increasingly desirable in view of the transfer of electronic information including business documents and other information over local networks and global networks. Also, content analysis mechanisms, such as virus detection mechanisms are known which detect commonly known viruses on a computer, or viruses travelling through or over networks. However, typical content analysis systems, such as virus detection mechanisms, can not generally operate properly on encrypted documents since the content analysis tools typically must be applied to clear text files, for example virus detection programs are not generally designed to decrypt encrypted information. Consequently, where a user has a virus detection mechanism such as a software application on a computer and also has encrypted documents on the computer, a virus may go undetected and become a latent destruction source when the document is decrypted and opened.

For example, typical virus detection programs will search a computer's hard drive or network server and only detect viruses in fully decoded information packets such as e-mail files and other files. Encrypted documents however cannot generally be analyzed to determine whether a virus is contained within the encrypted content. Hence a user may receive a notification by the virus detection system that no viruses have been detected when in fact viruses are still present in encrypted documents and are unleashed upon launching of the program through a decryption system.

Also, some networks are arranged to have a perimeter or firewall which may be a server through which all electronic information is first passed before being transferred to other networked computers within the perimeter to provide additional security. Such systems offer controlled screening of unwanted information through a common point prior to dissemination to other computers within a network. Some of these fire-walled or perimeter based computer network systems are known to have virus detection at the perimeter. However such perimeter control systems do not typically detect viruses or other specified content in encrypted documents being passed through the perimeter. Hence, a virus may be embedded in the encrypted information and may be allowed to infect the computers within the perimeter when the information is opened (decrypted). The encrypted information may also contain other undesired content which the perimeter control system is designed to filter out, but the analysis required to carry out such filtering is not possible when the information to be analyzed is encrypted.

Consequently, there exists a need for a computer based encryption and decryption system that provides content analysis, such as detection of a computer virus in encrypted information. Such a system should facilitate content inspection to provide a real-time communication of unauthorized content in encrypted files.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

Figure 3:
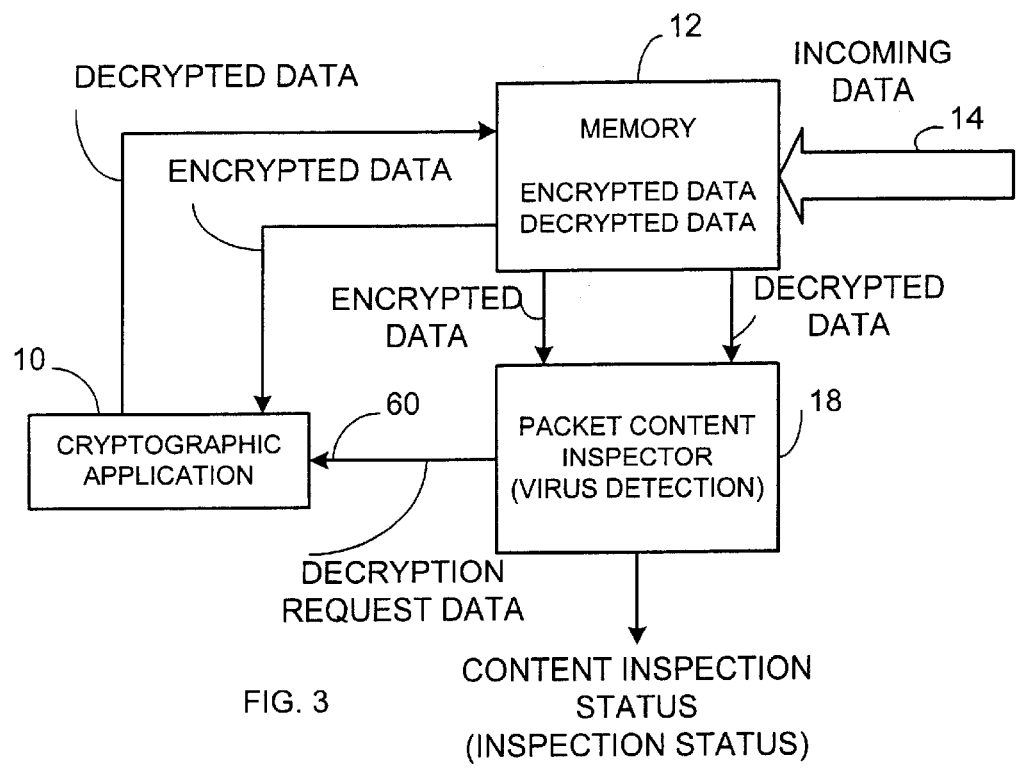
FIG. 3 is a flowchart generally showing an encryption/decryption system wherein a virus detection application launches a decryption process upon detection of encrypted incoming data in accordance with one embodiment of the invention.

A computer based encryption and decryption system is disclosed which provides content analysis through a content inspection mechanism, such as detection of a computer virus using a virus detection mechanism, based on determining whether digital input information is encrypted. The content inspection mechanism analyzes decrypted content for such things as virus patterns, keywords, unknown program format, clearance labels or any other content based criteria. The result of the inspection may be to trigger any of a number of actions, for example removal of a detected virus, filtering out programs of unknown format or non-approved formats, flagging files containing specific key words for additional scrutiny, or other desired action. The system generates a decryption request to decrypt encrypted digital input information prior to applying content analysis, such as virus detection. In response to the decryption request, the system decrypts the encrypted information prior to virus detection and applies a content analysis application, such as a virus detection algorithm, to the decrypted data. This may be done prior to allowing use of the decrypted digital information by other computers or prior to transferring data to other computers or applications within a computer.

In an alternative embodiment, the cryptographic system determines whether digital input information is encrypted and generates a content analysis request such as a virus detection request, to launch a virus detection algorithm or other content analysis algorithm. For example, the system decrypts the detected encrypted digital input information and applies virus detection to the decrypted digital information in response to the virus detection request, prior to allowing use or transfer of the decrypted digital input information.

Where the disclosed system is applied to a computer network configured with a perimeter control system, the system generates a decryption request to decrypt the decrypted information prior to applying a content inspection mechanism. Or conversely, the system generates a content analysis request to analyze incoming content after decryption.

Preferably, the system decrypts and runs virus detection on each document or file as the file is initially received by the computer or prior to transferring of the data for use by a target application Such a real time process can prevent a virus from being unknowingly unleashed as the file is first encountered by the system, as compared to conventional systems that would have otherwise allowed the virus to go undetected as an encrypted document. Also, if desired the combined decryption and content analysis, such as virus detection, can be run as a batch analysis as part of a maintenance program to decrypt all files in a hard drive or network server on a pre-determined schedule to check for viruses in decrypted documents. If desired, the content analysis application can be run on a file server which contains a backup copy of data. Significant results of any content analysis can then be summarized and conveyed for use on the original files, with the advantage that performance penalties of the overall analysis are minimized for online systems containing the original files.

In another embodiment, the system uses a controlled cryptographic key repository, such as a secure network server or third party holder of cryptographic keys as a key release agent (KRA) for releasing cryptographic keys for use in content analysis of data encrypted for a number of different users. The released keys are used in decrypting the incoming content such as in a networked perimeter system having a common repository that receives all incoming messages, or when performing a batch analysis of encrypted files. The system applies decryption on the repository data and then tags the data or sends subsequent notification to another recipient within the perimeter as to whether an encrypted document may contain a virus or other content requiring special processing or filtering.

Figure 1:
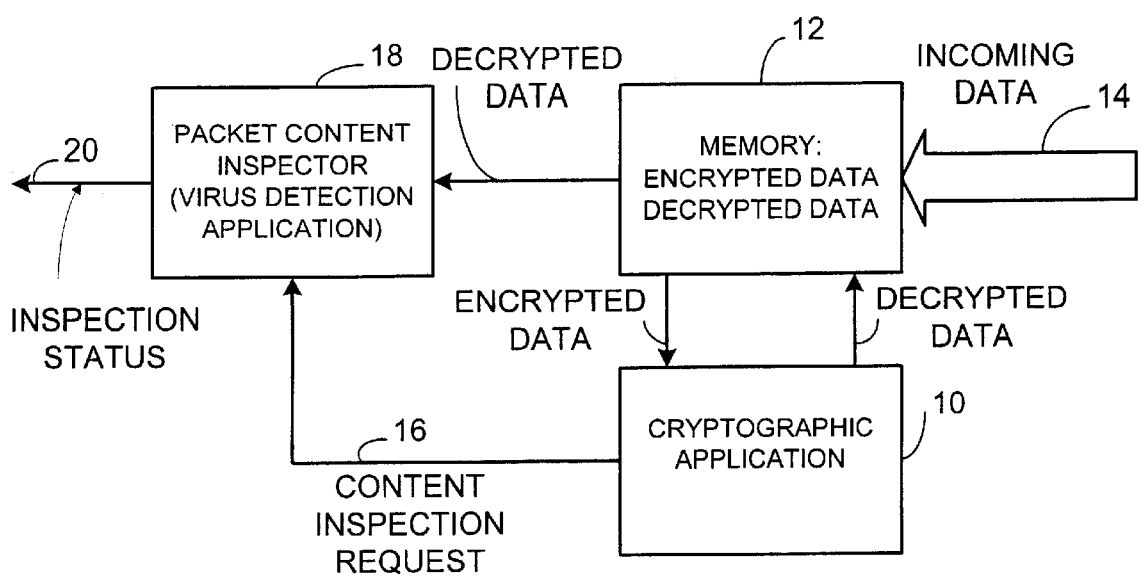
FIG. 1 is a block diagram generally depicting one embodiment of an encryption and decryption system with virus detection in accordance with one embodiment of the invention.

FIG. 1 depicts a portion of a computer system having a cryptographic software application 10 for accessing memory 12 that receives incoming data 14. The cryptographic software application 10 accesses memory 12 to decrypt encrypted data. The cryptographic application may be a public key cryptographic system or symmetric key system, or a combination of the two or any other suitable cryptographic system. Upon detection that incoming data 14 is encrypted, the cryptographic application 10 generates a content inspection request, such as a virus detection request 16 to launch a content inspection application 18 which provides content analysis on desired data. The cryptographic application 10 and content inspection application 18 may be stored on a storage medium such as a CD ROM, diskettes, hard drive or other suitable memory device and are programs that are executable by a computer to facilitate operation of the system as further set forth below.

The content inspection application 18 receives decrypted data from memory as decrypted and stored by the cryptographic application 10. The content inspection application 18, such as a virus detection program, analyzes the decrypted data to determine whether or not predefined content is contained in the decrypted data, or to determine what further action or processing should be applied to the data under inspection. For example where the packet content inspector 18 is a virus detection application, the cryptographic application 10 launches the virus detection application after decryption of the data or a portion of the data has been completed. The virus detection application then evaluates the decrypted data to determine, for example, whether or not an infection is present in the data and generates inspection status data 20, such as infection status data. Consequently, unlike conventional cryptographic systems, virus detection is launched by the cryptographic application and performed on decrypted data so that latent viruses are not present in the stored data.

Figure 2:
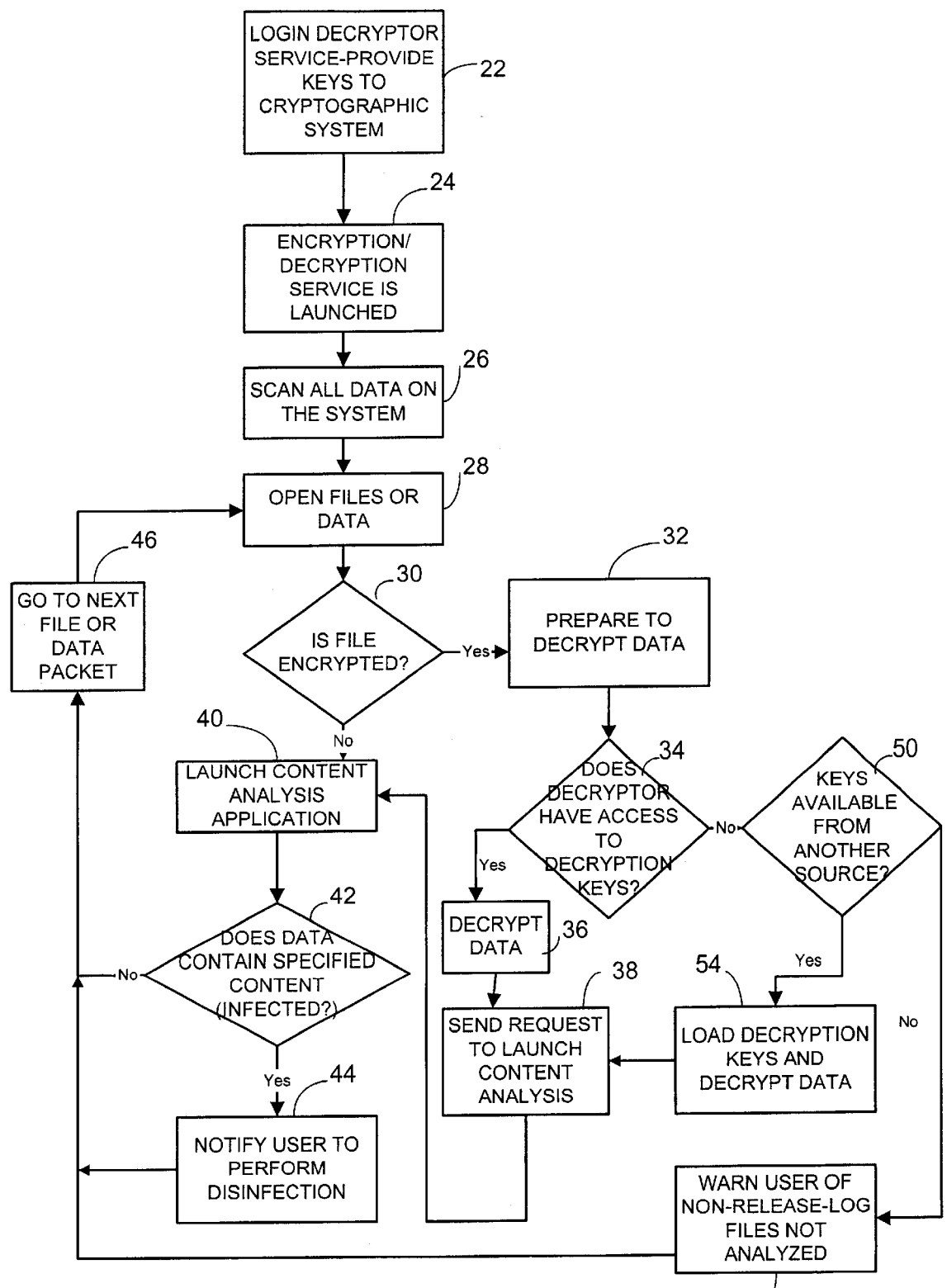
FIG. 2 is a flowchart generally illustrating a method for detecting specified content, such as a virus in an encryption and decryption system in accordance with one embodiment of the invention.

FIG. 2 shows one embodiment of the system of FIG. 1 as applied to a virus detection evaluation. As shown in block 22, a user, such as a software application or other process on a computer in a network or a perimeter guard computer (e.g., gateway or firewall) starts the decryption service by logging into the cryptographic system and obtaining access to keys to the cryptographic system for the user. Where all files are stored in various memories, and a batch or bulk virus detection is required, the user or perimeter guard launches the security process or cryptographic application 10 as indicated in block 24. The cryptographic application causes the computer to scan all data on the system (or alternatively, just a single file) as indicated in block 26. The cryptographic application opens files or data stored in memory as shown in block 28. The cryptographic application 10 then determines whether the file or data is encrypted by analyzing for example a file header. This is shown in block 30. If the file is determined to be encrypted by the cryptographic application, the security system prepares to decrypt the file or data as indicated in block 32. As used herein, a file may be any digital information in any form, and data may include packets of any type of digital information or any other data structures other than packets.

The cryptographic application assesses whether the user has access to the decryption keys or whether necessary decryption keys need to be obtained form another source, as indicated in block 34. For example, where the batch of data to be decrypted and analyzed is from many different users with varying encryption keys, the cryptographic system may have to obtain additional decryption key information from another source. If the computer performing the decryption has access to the decryption keys, the cryptographic application decrypts the data or file as shown in block 36. The cryptographic application then sends a content inspection request, such as a virus detection request, to launch the virus detection application as indicated in block 38. The virus detection application 18 then analyzes the decrypted data to determine whether a virus is present within the data as indicated in block 40 and 42.

If the data is infected, the virus detection application indicates that disinfection of the virus should be done. This communication is performed via infection status data 20. This is shown in block 44. If the data is not infected, the cryptographic application goes to the next data or file as shown in block 46, and opens the file or data as shown in block 28. This process continues for all inspected files and may be performed on a per data packet (or file) basis in real-time upon receipt of incoming data if desired instead of a bulk inspection process. In this way, e-mail or other data that is encrypted may be immediately evaluated for a virus prior to being further transmitted to other computers in the network. If desirable, the virus detection application (content analysis application) and cryptographic application can be running continuously in background.

Referring back to block 34, if the system determines that the cryptographic application 10 does not have access to the decryption keys, the system determines if the keys may be available from some other source such as a key release agent as indicated in block 50. If the key release agent does not have access to the keys, the user is optionally warned as indicated in block 52 and the system continues with the next file or data packet as shown in block 46. Where certain keys can not be obtained, certain data in the batch can not be decrypted and analyzed. The system 10 records the data that was not decrypted and analyzed in a file so that an operator may later check the files that were not evaluated.

If the keys are available from such another source however, the cryptographic application 10 loads the decrypt keys and decrypts the data as indicated in block 54. With the key release mechanism, the cryptographic application is an access controlled decryption mechanism. Preferably, the key release agent releases a decryption key to the decryptor of the cryptographic system based on predetermined access control criteria, as known in the art. For example, if the cryptographic system uses public-private key pairs, obtaining the keys from the key release agent may be performed as described in U.S. Pat. No. 5,481,613 entitled "Computer Network Cryptographic Key Distribution System" issued Jan. 2, 1996 to Ford et al, which is hereby incorporated by reference. However, any suitable key release methodology or system may be used.

If desired, a key release agent can be a fully integrated part of the user system. In other words, an organization, such as a corporation can have a secure server acting as a key release agent on behalf of users in the corporation. Otherwise a third party may serve as the key release agent if desired. Although not limited to bulk analysis systems, the key release agent offers an advantage where the data stored in the batch is for a number of different users with differing decryption keys because the necessary keys can be obtained from the same source if needed.

FIG. 3 shows another embodiment of the invention wherein incoming data 14 is first evaluated by content inspector application 18 such as virus detection application to determine whether the incoming data is encrypted. Preferably, the inspector 18 requests a user to enter data to effect login into the cryptographic application to facilitate decryption if necessary. If the content analysis application determines that the incoming data is encrypted, the content analysis application generates a decryption request signal 60 to notify the cryptographic application to decrypt the incoming data. The cryptographic application receives the encrypted data from the memory and causes the decrypted data to be stored back in memory 12. The decrypted data is then analyzed by the content inspection application 18, such as a virus detection application, to determine whether an infection in the data exists. Consequently, the virus detection application, or content inspector 18 launches a decryption application in response to incoming data.

Figure 4:
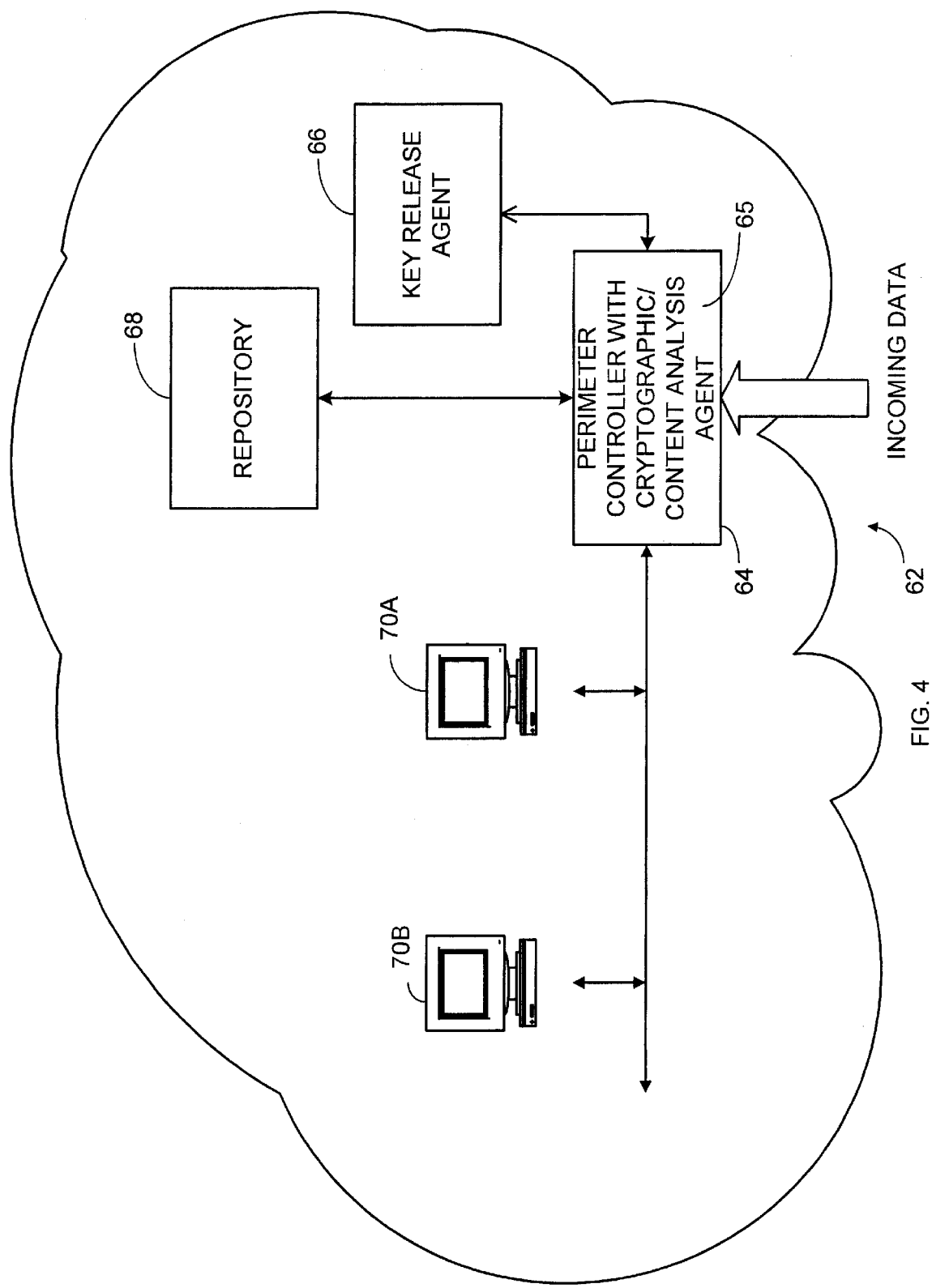
FIG. 4 is a block diagram generally illustrating a perimeter guarded computer network system containing an encryption and decryption system with content inspection capabilities in accordance with one embodiment of the invention.

FIG. 4 shows a perimeter or firewall controlled computer network 62 having a perimeter control computer 64 through which all incoming data is channeled. The perimeter control computer 64 contains a software based encryption/decryption/content analysis agent 65 that may be a content analysis program 18 that requests launch of a decryption application 10, or a decryptor in a cryptographic application that requests launch of a content analysis program 18, or a combination of both. The decryptor in the perimeter control computer 64 is an access controlled decryption mechanism as previously mentioned and the network 62 further includes a key release agent 66 in operative communication with the perimeter control computer 62 for releasing the decryption key to the decryptor based on access control criteria met by information sent from the perimeter control computer or other suitable access mechanisms. Access control criteria can be standard challenge-response techniques as known in the art.

The network 62 includes a common file storage device or memory unit such as repository 68 within the perimeter controlled network 62, that is accessible by the perimeter control computer. The common repository 68 stores the encrypted digital input information and stores decrypted (or the originally encrypted) information prior to dissemination of decrypted information to computer nodes 70a and 70b within the network 62. The perimeter control computer periodically activates the encryption/decryption/content analysis agent 65 to detect encrypted data when needed, providing content analysis in encrypted digital information to perform batch content analysis in encrypted files stored in the repository. Periodic activation includes continually running the encryption/decryption/content analysis agent 65 in background.

In operation, the network 62 receives incoming data, wherein data is stored in the common repository 68 through the perimeter control computer 64. The encryption/decryption/content analysis agent 65 loaded on the perimeter computer 64 generates a decryption request to decrypt the encrypted information in the common repository 68 prior to applying a content inspection mechanism as previously described with reference to FIG. 2. Or conversely, the agent 65 generates a content analysis request to analyze incoming content after decryption as previously describe with reference to FIG. 3. If desired, the incoming data can first be stored in the common repository 68 to store the encrypted digital input information. The encryption/decryption/content analysis agent 65 determines whether the incoming data is encrypted and requests a decryption key release from the key release agent 66.

If release is authorized, the encryption/decryption/content analysis agent 65 decrypts and stores decrypted information for content analysis prior to dissemination of decrypted information to computer nodes 70a or 70b within the network 62. The decrypted information is stored in the repository 68, which may be disk storage or other memory such as RAM in the perimeter guard computer.

The content analyzer, such as a virus detection algorithm, determines whether specified data is present in the decrypted information. The perimeter computer then sends a message to the target user of the incoming information notifying the user that the data contains a virus or contains other specified content. Alternatively, the encryption/decryption/content analysis agent 65 tags the encrypted file sent to the user or tags the data in the repository so other users are appropriately notified. If desired, the encryption/decryption/content analysis agent 65 can notify the perimeter computer to delete the infection data from the network to avoid spread of a virus. Similarly, when the content analysis detects other criteria, the encryption/decryption/content analysis agent 65 can filter the appropriate data and flag files as containing special keywords, labels or other criteria.

If desired, the content analysis application can be run on a file server which contains a backup copy of data. A batch decryption and content analysis operation is performed on all of the back up copies. Significant results of any content analysis can then be summarized and conveyed for use on the original files by the server, with the advantage that performance penalties of the overall analysis are minimized for online systems containing the original files. Hence the server generates content analysis status information and sends the information to an appropriate node in the network designated as a user, owner or administrator of the file or packet.

Alternatively, data sent to the perimeter control computer, such as messages or packets or other data, are structured so that the perimeter guard computer is a recipient that filters each message in real time prior to transferring encrypted or decrypted data to a designated recipient within the network perimeter. The perimeter guard computer is preferably designated in a header, that may be transparent to operators of the system, along with other recipients in a message. In a public-private key cryptographic system for example, the perimeter control computer keeps its own private key decryption key locally so no key release agent is needed. Hence the perimeter control computer is an extra virtual recipient for which messages are encrypted. The received incoming data is temporarily stored in the perimeter guard computer memory (RAM) for decryption and analysis and immediately processed by the perimeter guard control computer to facilitate real-time analysis and filtering. Upon completion of processing, the input information is forwarded to the designated recipient.

The data header includes the decryption information for the perimeter control computer and other recipients so that each intended recipient can decrypt the message from a copy of the same message. Hence, under control of the encryption/decryption/content analysis agent 65, the perimeter guard computer temporarily stores the encrypted digital input information so that it can apply decryption on the message using the header decryption information as the data is received, prior to routing the incoming data to the designated recipient(s). Preferably, the data is routed as originally encrypted data to the recipient after content analysis has been performed. The data decrypted for content analysis may alternatively be re-encrypted at the perimeter by the perimeter control computer, or forwarded to the recipient(s) as cleartext if the environment within the perimeter is fully trusted.

Results of any content analysis can then be conveyed to a security officer terminal or to the recipient, or recorded in a local file which can subsequently be consulted by administrative personnel or end-users. For example, if undesired content is detected, the data can be deleted and not forwarded to the recipient. If certain content is found, a copy of the data can be stored in the common repository for analysis by another system, such as security system. Hence the server generates content analysis status information and sends the information to an appropriate node in the network designated as a recipient of the data (file) or packet.

Accordingly, the disclosed system may perform real time processing of messages or other data passing through the firewall before allowing the message to be passed to a designated recipient. The system may also be configured to perform non-real time decryption and analysis using a store-and-forward approach by storing incoming data in a repository and analyzing the data before sending the data to a recipient. Also, the system may be configured to provide off-line analysis at the perimeter but the data is forwarded to the intended recipient and a copy is kept at the repository and analyzed independent of the unanalyzed copy that was forwarded on to the recipient.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A computer based encryption and decryption system comprising:

means for providing content analysis having means for determining whether digital input information that includes at least a part of one of a file, document and a body of a message is encrypted using a cryptographic key and for generating a decryption request to decrypt the encrypted digital input information prior to applying content analysis to facilitate content analysis within encrypted digital input information; and means, responsive to the decryption request and the digital input information, for decrypting the encrypted digital input information prior to commence of the content analysis using a private decryption key of a public key pair, apart from within the content to facilitate controlled content analysis wherein content analysis includes performing virus detection to facilitate eradication of a detected virus, wherein decrypting is done without using decryption executables contained in a header corresponding to the digital input information, if a header is present.

2. The encryption and decryption system of claim 1 wherein the means for providing content analysis facilitates commencement of content analysis upon completed launch of a decrypting operation of the encrypted digital input information to facilitate content analysis prior to allowing subsequent use of the decrypted digital input information on a computer system.

3. The encryption and decryption system of claim 1 wherein the means for providing content analysis facilitates commencement of content analysis upon completed launch of a decrypting operation of the encrypted digital input information to facilitate content analysis prior to allowing subsequent transfer of the decrypted digital input information.

4. The encryption and decryption system of claim 1 wherein the system is on a computer network having a file storage device containing digital information in files for at least one network user and the system includes means for periodically activating the means for providing content analysis in encrypted digital information to perform batch content analysis in encrypted files stored in the file storage device.

5. The system of claim 1 wherein the means for decrypting receives released cryptographic keys for use in content analysis of data stored for a number of different users from a controlled cryptographic key repository.

6. The system of claim 5 wherein the controlled cryptographic key repository releases a decryption key to the means for decrypting based on predetermined access control criteria.

7. The system of claim 1 wherein the means for providing content analysis controls a perimeter guard computing device to perform real time content analysis of the digital input information passing through the perimeter before allowing the digital input information to be passed to a designated recipient.

8. The system of claim 1 further including a repository within a perimeter controlled network, operatively coupled to the means for decrypting and to the means for providing content analysis, for storing decrypted information for content analysis prior to dissemination of the digital input information within the network.

9. A computer based encryption and decryption system comprising:

means for determining whether digital input information that includes at least one of a file, document and at least part of a body of a message is encrypted using a cryptographic key and for generating a content analysis request, means, responsive to the means for determining, for decrypting detected encrypted digital input information using a private decryption key of a public key pair, apart from within the content to facilitate controlled content analysis; and means, responsive to the content analysis request, for applying content analysis to the decrypted digital input information wherein content analysis includes performing virus detection to facilitate eradication of a detected virus, wherein decrypting is done without using decryption executables contained in a header corresponding to the digital input information, if a header is present.

10. The encryption and decryption system of claim 9 wherein the means for determining facilitates commencement of content analysis upon completed launch of a decrypting operation of the encrypted digital input information to facilitate content analysis prior to allowing subsequent use of the decrypted digital input information on a computer system.

11. The encryption and decryption system of claim 9 wherein the means for applying content analysis facilitates commencement of content analysis upon completed launch of a decrypting operation of the encrypted digital input information to facilitate content analysis prior to allowing subsequent transfer of the decrypted digital input information.

12. The encryption and decryption system of claim 9 wherein the system is in a computer network having a file storage device containing digital information in files for multiple network users and the system includes means for periodically activating the means for generating the content analysis request to perform batch content analysis in encrypted files stored in the file storage device.

13. The system of claim 9 wherein the means for decrypting receives released cryptographic keys for use in content analysis of data encrypted for a number of different users from a controlled cryptographic key repository.

14. The system of claim 13 wherein the controlled cryptographic key repository releases a decryption key to the means for decrypting based on predetermined access control criteria.

15. The system of claim 9 wherein the means for applying content analysis controls a perimeter guard computing device to perform real time content analysis of the digital input information passing through the perimeter before allowing the digital input information to be passed to a designated recipient.

16. The system of claim 9 including a repository within a perimeter controlled network, operatively coupled to the means for decrypting and to the means for applying content analysis, for storing decrypted information prior to dissemination of the digital input information within the network.

17. An encryption and decryption method comprising:
providing content analysis by determining whether digital input information that includes at least one of a file, document and at least part of a body of a message is encrypted and generating a decryption request to a decryptor to decrypt the encrypted digital input information prior to applying content analysis to facilitate content analysis within the encrypted digital input information; and
decrypting the encrypted digital input information prior to completion of the content analysis wherein content analysis includes performing virus detection to facilitate eradication of a detected virus, wherein decrypting is done without using decryption executables contained in a header corresponding to the digital input information, if a header is present.

18. The encryption and decryption method of claim 17 wherein the step of providing content analysis includes commencing content analysis upon completed launch of a decrypting operation of the encrypted digital input information to facilitate content analysis prior to allowing subsequent use of the decrypted digital input information on a computer system.

19. The encryption and decryption method of claim 17 wherein the method is performed on a computer network having a file storage device containing digital information in files for multiple network users and the method includes periodically activating content analysis in encrypted digital information to perform batch content analysis in encrypted files stored in the file storage device.

20. The encryption and decryption method of claim 17 wherein the step of providing content analysis includes commencing content analysis upon completed launch of a decrypting operation of the encrypted digital input information to facilitate content analysis prior to allowing subsequent transfer of the decrypted digital input information on a computer system.

21. The method of claim 17 wherein decrypting includes receiving released cryptographic keys for use in content analysis of data stored for a number of different users from a controlled cryptographic key repository.

22. The method of claim 21 wherein the controlled cryptographic key repository releases a decryption key for decrypting based on predetermined access control criteria.

23. The method of claim 21 further including providing a repository within a perimeter controlled network for storing decrypted information prior to dissemination of the digital input information within the network.

24. The method of claim 17 wherein the step of providing content analysis includes controlling a perimeter guard computing device to perform real time content analysis of the digital input information passing through a perimeter before allowing the digital input information to be passed to a designated recipient.

25. A computer based encryption and decryption method comprising:
determining whether digital input information that includes at least one of a file, document and at least part of a body of a message is encrypted;
generating a content analysis request based on the determination;
decrypting detected encrypted digital input information, wherein decrypting is done without using decryption executables contained in a header corresponding to the digital input information, if a header is present; and
applying content analysis to the decrypted digital input information wherein content analysis includes performing virus detection to facilitate eradication of a detected virus.

26. The encryption and decryption method of claim 25 wherein the step of applying content analysis includes commencing content analysis upon completed launch of a decrypting operation of the encrypted digital input information to facilitate content analysis prior to allowing subsequent transfer of the decrypted digital input information on a computer system.

27. The encryption and decryption method of claim 25 wherein the step of applying content analysis includes commencing content analysis upon completed launch of a decrypting operation of the encrypted digital input information to facilitate content analysis prior to allowing subsequent use of the decrypted digital input information on a computer system.

28. The encryption and decryption method of claim 25 wherein the method is performed on a computer network having a file storage device containing digital information in files for multiple network users and the method includes periodically activating content analysis in encrypted digital information to perform batch content analysis in encrypted files stored in the file storage device.

29. The method of claim 25 wherein decrypting includes receiving released cryptographic keys for use in content analysis of data stored for a number of different users from a controlled cryptographic key repository.

30. The method of claim 29 wherein the controlled cryptographic key repository releases a decryption key for decrypting based on predetermined access control criteria.

31. The method of claim 29 further including providing a repository within a perimeter controlled network for storing decrypted information prior to dissemination of the digital input information within the network.

32. The method of claim 25 wherein the step of applying content analysis includes controlling a perimeter guard computing device to perform real time content analysis of the digital input information passing through a perimeter before allowing the digital input information to be passed to a designated recipient.

33. A storage medium comprising:
a program executable by a computing mechanism that facilitates the following steps:
determining whether digital input information that includes at least one of a file, document and at least part of a body of a message is encrypted;
generating a request from the group of at least a content analysis request and a decryption request, based on the determination;
decrypting detected encrypted digital input information based on the generated request, wherein decrypting is done without using decryption executables contained in a header corresponding to the digital input information, if a header is present; and
applying content analysis to the decrypted digital input information prior to allowing use of the decrypted digital input information wherein content analysis includes performing virus detection to facilitate eradication of a detected virus.

34. The storage medium of claim 33 wherein decrypting includes receiving released cryptographic keys for use in content analysis of data stored for a number of different users from a controlled cryptographic key repository.

35. The storage medium of claim 33 wherein the program also facilitates periodically activating content analysis in encrypted digital information to perform batch content analysis in encrypted files stored in the file storage device.

36. The storage medium of claim 33 wherein the program also facilitates decryption operation on the encrypted digital input information prior to transferring of the digital input information for use by a target application.

37. A computer based encryption and decryption system comprising:
means for providing content analysis having means for determining whether digital input information that includes at least a part of one of a file, document and a body of a message is encrypted using a cryptographic key and for generating a decryption request to decrypt the encrypted digital input information prior to applying content analysis to facilitate content analysis within encrypted digital input information; and
means, responsive to the decryption request and the digital input information, for decrypting the encrypted digital input information prior to commence of the content analysis using a private decryption key of a public key pair, apart from within the content to facilitate controlled content analysis wherein the private decryption key is accessed from a repository containing stored private decryption keys of a number of different users.

38. The encryption and decryption system of claim 37, wherein the means for providing content analysis facilitates commencement of content analysis upon completed launch of a decrypting operation of the encrypted digital input information to facilitate content analysis prior to allowing subsequent transfer of the decrypted digital input information.

39. The encryption and decryption system of Claim 37, herein the system is on a computer network having a file storage device containing digital information in files for at least one network user and the system includes means for periodically activating the means for providing content analysis in encrypted information to perform batch content analysis in encrypted files stored in the file storage device.

* * * * *